United States Patent
Rice et al.

(10) Patent No.: US 7,373,043 B2
(45) Date of Patent: May 13, 2008

(54) IMAGE DETECTION USING MULTIMODE FIBER AMPLIFIER

(75) Inventors: Robert Rex Rice, Simi Valley, CA (US); Sami Ali Shakir, Albuquerque, NM (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 11/280,904

(22) Filed: Nov. 16, 2005

(65) Prior Publication Data

US 2007/0110364 A1 May 17, 2007

(51) Int. Cl.
*G02B 6/26* (2006.01)

(52) U.S. Cl. .......................... 385/33; 385/49

(58) Field of Classification Search ............ None
See application file for complete search history.

(56) References Cited

U.S. PATENT DOCUMENTS

| | | | |
|---|---|---|---|
| 3,777,150 A * | 12/1973 | Miller | 250/208.6 |
| 5,574,553 A | 11/1996 | McManamon et al. | |
| 5,877,851 A | 3/1999 | Stann et al. | |
| 6,844,924 B2 | 1/2005 | Ruff et al. | |
| 7,042,631 B2 * | 5/2006 | Smith et al. | 359/333 |
| 7,194,156 B2 * | 3/2007 | Deliwala | 385/29 |
| 2003/0063884 A1 * | 4/2003 | Smith et al. | 385/129 |

OTHER PUBLICATIONS

Bradley D. Duncan, et al.: "Performance Analysis of a Heterodyne Lidar System Incorporating a Multimode Optical Waveguide Receiver"; pp. 1133-1141 (1993).
Michael S. Salisbury, et al.: "Signal to Noise Ratio Improvement in Lidar Systems Incorporating Neodymium Doped Optical Fiber Preamplifiers"; pp. 1097-1103 (1992).
L. Morvan, et al.: "The Building Blocks for a Two-Frequency Laser Lidar-Radar: Concept and Preliminary Experimental Results"; Applications of Photonic Technology 5, Roger A. Lessard, George A. Lampropoulos, Gregory W. Schinn, Editors, Proceedings of SPIE vol. 4833 pp. 153-165 (2002).

* cited by examiner

*Primary Examiner*—Sarah Song
(74) *Attorney, Agent, or Firm*—Tarolli, Sundheim, Covell & Tummino LLP

(57) ABSTRACT

An image detection system includes a multimode fiber amplifier. The multimode fiber amplifier includes a core configured to receive an input image that includes a plurality of input beams spanning a range of incidence angles and to propagate at least some of the input beams as different ones of a plurality of transverse modes along the core. The multimode fiber amplifier provides an amplified image at an output facet thereof corresponding to the input image. A focal plane detector includes an array of detectors arranged to receive different portions of the amplified image.

22 Claims, 4 Drawing Sheets

IMAGE DETECTION USING MULTIMODE FIBER AMPLIFIER

BACKGROUND

Optical fiber amplifiers and preamplifiers are employed in a variety of technologies, including telecommunications fields. A fiber amplifier typically includes a gain fiber, the core of which includes rare-earth dopant ions, such as erbium or neodymium. One or more laser diodes (or other pumping means) are coupled to the fiber to provide a pump signal to the fiber core. When optically pumped, the fiber exhibits gain over a wavelength region characteristic of the rare-earth dopant. The amplifier gain is related to the amount of pump power coupled to the gain fiber as well as to the length of the fiber. Also, the output power of the amplifier may influence the frequency response of the amplifier to signal modulation.

Both single mode and multimode fibers have been utilized to implement optical fiber amplifiers. A multimode fiber amplifier can propagate and amplify multiple modes (e.g., hundreds or thousands of modes) whereas a single mode fiber amplifier amplifies a single mode. In a multimode mode fiber, modes are a set of guided electromagnetic waves that travel unchanged in an optical fiber except for gain or loss. The modes thus can be described as solutions of Maxwell's equation for electromagnetic waves propagating in the bound core medium of the fiber.

The different transverse modes also travel at different speeds through the multimode fiber, which is referred to as modal dispersion and results in multimode distortion. Multimode distortion is a mechanism that occurs in multimode fibers in which the signal is spread in time because the velocity of propagation of the optical signal is not the same for all modes. For example, those rays which undergo the fewest number of reflections while propagating through the core will traverse the length of the fiber sooner than those rays which undergo a greater number of reflections. As a result of multimode distortion, the useful communication bandwidth of multimode fibers is limited. Additionally, amplified spontaneous emissions can occur for both single mode and multimode fiber amplifiers, which can add noise and reduce gain of the fiber amplifier. In view of these and limitations inherent in multimode fiber amplifiers, there has been a general reluctance to develop and utilize multimode fiber amplifiers in certain commercial technologies; consequently, potentially useful applications have been overlooked or neglected.

SUMMARY

The present invention relates generally to image-detection using a multimode fiber amplifier.

One aspect of the present invention provides an image detection system that includes a multimode fiber amplifier. The multimode fiber amplifier includes a core configured to receive an input image that includes a plurality of input beams spanning a range of incidence angles and to propagate at least some of the input beams as different ones of a plurality of transverse modes along the core. The multimode fiber amplifier provides an amplified image at an output facet thereof corresponding to the input image. A focal plane detector includes an array of detectors arranged to receive different portions of the amplified image.

Another aspect of the present invention provides an image detection system that includes a multimode fiber amplifier. The multimode fiber amplifier includes a core having a length set to a predetermined phase-matching length such that an input image an input facet of the core is substantially in-phase with an output image at an output facet of the core. For example, by use of the predetermined phase-matching length, the output image substantially faithfully replicates the input image with gain. Signal power of the input image is amplified as different portions of the input image propagate as different transverse modes through the core. The output image includes amplified spontaneous emissions distributed across the different transverse modes of the core. At least one filter is arranged to remove at least a substantial portion of the amplified spontaneous emissions from the output image to provide a corresponding filtered output image. A focal plane detector includes an array of detectors arranged to receive different portions of the filtered output image.

Yet another aspect of the present invention provides a laser detection and ranging (ladar) system. The ladar system includes a transmitter configured to transmit beams of electromagnetic radiation energy. A first telescope directs the beams of radiation energy at a target scene. A second telescope receives returning portions of the radiation energy reflected off at least one object in the target scene. A multimode fiber amplifier includes a core configured to receive an input image from the second telescope that includes a plurality of input beams spanning a range of incidence angles and to propagate at least some of the input beams as different ones of a plurality of transverse modes along the core. For example, the input beams may correspond to return signal energy from spaced apart targets. The multimode fiber amplifier provides an output image at an output facet thereof corresponding to the input image with increased signal power. A focal plane detector includes an array of detectors arranged to receive different portions of the output image. A processor determines at least one of range, distance or velocity of the at least one target based at least in part on the output image.

DETAILED DESCRIPTION

Figure 1:
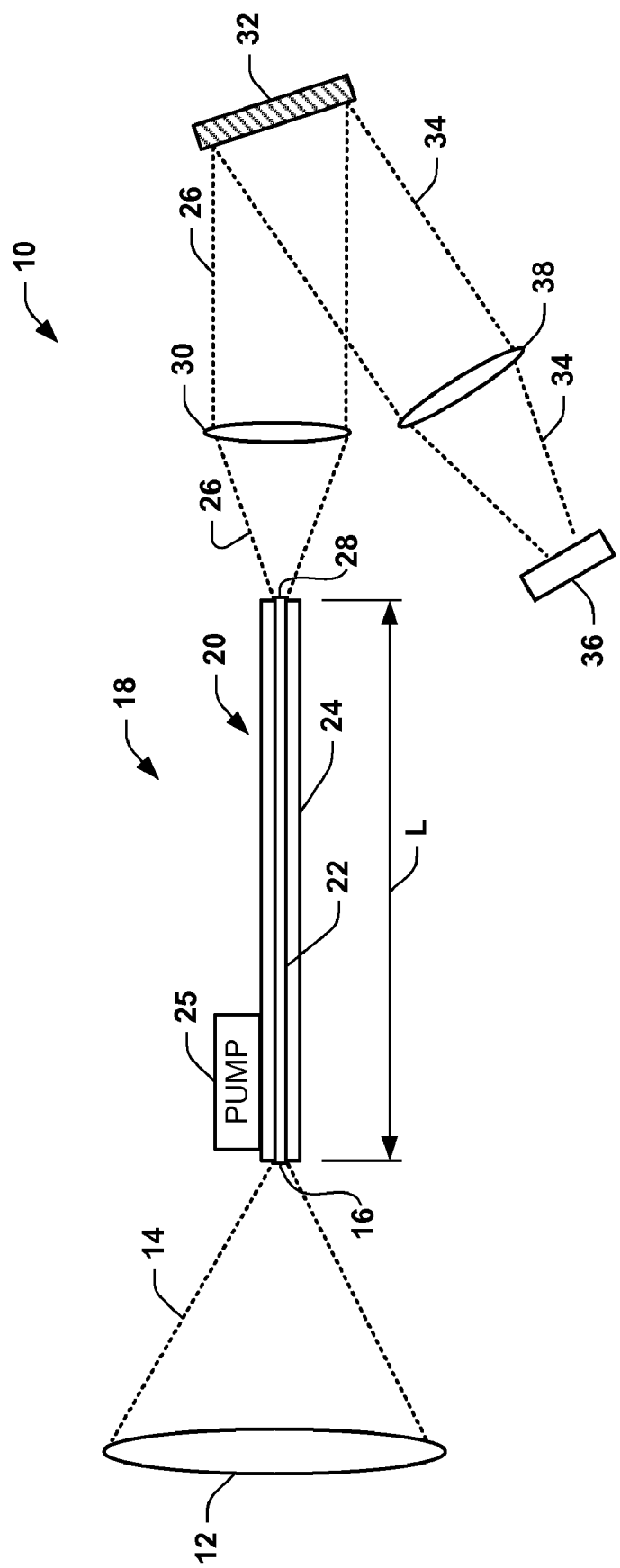
FIG. 1 depicts an example of an image detection system that can be implemented in accordance with an aspect of the present invention.

FIG. 1 depicts a schematic view of an image detection system 10 that can be implemented in accordance with an aspect of the present invention. The system 10 includes an input telescope or (other lens system) 12 that receives one or more input images. The telescope 12 provides an input signal 14 onto an input facet 16 of a fiber amplifier 18. The input signal 14 includes a plurality of input light rays or beams, each having a respective angle of incidence relative to the input facet 16. The plurality of input light rays or beams collectively define the input image.

The fiber amplifier 18 includes a multimode optical fiber 20 with a core 22 that defines the central, light carrying part of the optical fiber. The multimode fiber 20 is an optical fiber corresponding to a waveguide that is designed to carry multiple light rays or modes (referred to as "transverse modes") concurrently. Modes result from the fact that light will only propagate in the fiber core at discrete angles within a cone of acceptance.

The core 22 in the multimode fiber 20 has a refractive index. As one example, the fiber 20 can be a graded-index multimode fiber having a refractive index that varies as a function of the radial distance from the fiber axis. One common type of graded-index fiber has a substantially parabolic or quadratic refractive index profile. The parabolic refractive index profile results in continual refocusing of the rays in the core, and thus compensates for some multimode distortion. Other types of multimode fibers can also be utilized in the system 10, such as fibers having other types of core profiles (e.g., other shapes of graded-index profiles as well as step profiles). The fiber 20 also includes a cladding 24 that forms the outer concentric layer that surrounds the fiber core 22. The core 22 has an index of refraction that is higher than that of the surrounding cladding 24.

The fiber amplifier 18 can also include one or more pumps 25 that supply energy at one or more desired wavelengths (or range of wavelengths) and at predetermined energy level for the fiber amplifier 18. For the example of an erbium doped fiber amplifier, the pump 25 can be implemented as a diode-pumped solid-state laser system that supplies energy at a wavelength of about 980 nm and an associated power (e.g., in the mW range). Those skilled in the art will understand and appreciate various types and configurations of pumps that could be utilized for pumping suitable electromagnetic energy into the core 22. Additionally, various types of couplings or taps can also be employed for introducing the pumping electromagnetic energy from the pump 25 and into the core 22.

The fiber amplifier 18 transmits an amplified optical output signal 26 from an output facet 28 of the optical fiber 20. The output signal 26 defines an image formed of a plurality of optical signals (e.g., rays or beams) traveling in a plurality of modes through the core 22 of the optical fiber 20. Since the velocity of propagation of the optical signal through the fiber is not the same for all modes (e.g., due to multimode distortion), the output signal 26 may include portions of the input image 14 shifted in time. The respective images in the output signal 26 correspond to amplified versions of the incident input images 14.

According to an aspect of the present invention, the fiber amplifier 18 is configured to have a length (L), referred to herein as the "phase-matching length," where the modes of interest (i.e., the transverse modes) are in-phase at the exit facet of the multimode fiber 20. The phase matching length L can be repeated, such that the phases of the transverse modes of the multimode fiber amplifier differ by an integer multiple of $2\pi$ at the exit facet of the multimode fiber 20. When the phases of the transverse modes of the multimode fiber amplifier differ by integer multiples of $2\pi$, the transverse modes are substantially in phase with the input image signals 14 provided at the input facet 16. The transverse modes, when in phase at the output facet 28, are concentrated spatially at the output facet in substantially the same relationship as at the input facet 16. As a result, the fidelity of the input image that is represented in transverse modes is substantially preserved at the output 28 (see, e.g., FIG. 5).

During propagation of the transverse modes through the fiber amplifier 18, spontaneous emissions will occur and be amplified along the length. The amplified spontaneous emissions (ASE) apply substantially uniformly across all the modes of the fiber 20. Accordingly, some of the ASE are applied to the coherent signal (corresponding to the image defined by the input signal 14) with the remaining portion of the ASE distributed to other of the multiple modes. For example, where the input optical signal 14 includes X separate input images (where X is a positive integer denoting the number of input images) and the multimode fiber can propagate Y modes (where Y is positive integer denoting the number of available modes, and Y>X), the relative amount ASE on the X amplified images decreases as Y increases. The number of modes further varies as a function of the diameter of the core 22. That is, the core 22 diameter increases proportionately to support a greater number of modes. It will be appreciated that providing a larger number of modes Y increases the capacity of the multimode fiber 20 to transmit a larger number of images X.

Referring back to FIG. 1, the fiber amplifier 18 transmits the output optical signal 26 through a relay lens 30 for relaying the output signal onto a filter 32. The filter 32 is configured (e.g., as a bandpass filter) to pass the specified wavelength windows used by the ladar system and block the unwanted ASE noise. It is a general property of ASE noise that such noise is emitted across the entire gain spectrum of the fiber lasant medium, whereas the wavelength window used by a particular ladar system is quite narrow by comparison (e.g., 30 nm for ASE noise versus typically around 0.03 nm for the ladar). For example, the filter 32 can be implemented as a holographic filter or volume Bragg grating, although other types of optical filters can be utilized to filter out ASE and other optical noise. The particular frequency band or bands passed by the filter 32 can be determined based on the range of frequencies desired to be imaged at the focal plane.

The filter 32 transmits a corresponding filtered optical signal 34 onto a corresponding detector array 36 that lies in a focal plane. As depicted in the example of FIG. 1, one or more additional lenses 38 can be positioned between the filter 32 and the focal plane detector array 36. The one or more lens 38 can focus the filtered optical signal 34 to provide the image onto the focal plane detector array 36. By controlling the input image to reside in a narrow band of frequencies (or wavelengths), the proportion of ASE relative to the image content in this narrow band is low. Hence, a significant majority of ASE is successfully rejected by the filter 32 before becoming incident on the detector array 36. The remaining portion of the ASE in a narrow band around the desired signal wavelength passes through the filter 32 and arrives at the focal plane detector 36. Since this narrowband ASE is distributed across all transverse modes of the fiber 20 in an incoherent manner, it is distributed across the entire detector array 36 and does not come to a focus on any particular pixel. However, the target image is transmitted by the modes of the fiber 20 in a spatially coherent manner and consequently comes to a focus on the detector array at a particular pixel. Hence, the system 10 affords spatial rejection of ASE. By having the input image in a narrow band, the system 10 provides both spectral and spatial rejection of ASE results in an increased signal-to-noise ratio. Stated differently, there is an increased signal-to-noise ratio because the ASE combines incoherently at the focal plane detector array 36, whereas the image signal combines coherently.

The detector array 36 includes a plurality of photodetectors. The size of the array 36 (e.g., the number of pixels) can vary to provide a desired low resolution image. By way of example, the detector array 36 can include an array of 4×4, 9×9, or 4×25 detectors or other desired arrangement. The number of modes being propagated through the optical fiber 20 should be greater than (e.g., at least two times greater than) the number of pixels in the detector array 36. By utilizing a multimode fiber amplifier 18, each pixel can correspond to a different input beam (or one or more rays) along a different angle of incidence relative to the input facet 16. In this way, the collective set of pixels in the detector array 36 receives different portions of the amplified and filtered output image.

As mentioned above, the length of the multimode fiber amplifier 12 is set to a phase-matching length, which corresponds to one or more length(s) L of a multimode fiber (in this case, multimode fiber amplifier 18) at which the modes of the fiber are in phase, achieving a beam quality close to unity. The phase-matching length(s) may be determined as described below.

The input signal 14 that is applied to the input facet of the multimode fiber amplifier 18 corresponds to an electromagnetic field $E_0(r,\phi)$. The input field $E_0(r,\phi)$ will decompose into a plurality of modes supported by the multimode fiber amplifier as follows:

$$E_o(r, \phi) = \sum_{l=0}^{l_{max}} \sum_{m=1}^{m_{max}} c_{lm} \Psi_{lm}(r, \phi) \qquad \text{Eq. 1}$$

where r, $\phi$, are the radial and azimuth coordinates, and $\Psi_{lm}(r,\phi)$, and $c_{lm}$ are the multimode fiber amplifier 18 modes and decomposition constants, respectively. The indices l and m correspond to the azimuth and radial quantum number of the modes of the multimode fiber amplifier 18. The field inside the multimode fiber amplifier 18 can be represented by the following:

$$E(r, \phi, z, t) = \sum_{l=0}^{l_{max}} \sum_{m=1}^{m_{max}} c_{lm} \Psi_{lm}(r, \phi) \cdot e^{g_{lm} z} \cdot e^{-i(\omega \cdot t + \beta_{lm} \cdot z)} \qquad \text{Eq. 2}$$

where $g_{lm}$ is the gain of the (l, m) mode, $\omega$ is the circular frequency of the input beam 14, $\beta_{lm}$ is the propagation vector of the (l, m) mode of the multimode fiber amplifier 18, and z, t, are the lateral and time variables, respectively.

The output field at the exit facet of the multimode fiber amplifier 18 of the phase-matching length L can be represented as follows:

$$E(r, \phi, z, t) = \qquad \text{Eq. 3}$$
$$e^{-i(\omega \cdot t + \beta_{01} \cdot L)} \cdot e^{g_{01} \cdot L} \sum_{l=0}^{l_{max}} \sum_{m=1}^{m_{max}(l)} c_{lm} \Psi_{lm}(r, \phi) \cdot e^{(g_{lm} - g_{01}) \cdot L} \cdot e^{-i \Delta \beta_{lm} \cdot L}$$

As described herein, the length L of the multimode fiber amplifier 18 is chosen such that the phase-matching condition is satisfied (i.e., the transverse modes of the multimode fiber amplifier 18 are in phase at the output facet 28). This phase-matching condition can be defined as follows:

$$\Delta \beta_{lm} \cdot L = 2 \cdot \pi \cdot q_{lm} \qquad \text{Eq. 4}$$

where $q_{lm}$ is an integer which depends on l and m.

Substituting Eq. 4 into Eq. 3, and assuming the phase-matching condition occurs when the gain for the different modes is approximately equal, Eq. 3 reduces to the following expression:

$$E_1(r, \phi) = E_0(r, \phi) \cdot e^{g \cdot L} \cdot e^{-i(\omega \cdot t + \beta_{01} \cdot L)} \qquad \text{Eq. 5}$$

In practice, the gains for the different modes may not be equal, since the overlap of the different modes with the core 22 of the multimode fiber amplifier 18, where gain takes place, is different depending on each mode. However, the beam quality of the output of the amplifier 18 is dictated mostly by phase distortion rather than amplitude distortion. For the example of a step-index multimode fiber amplifier 18, a numerical search for a length, which satisfies Eq. 4 as closely as possible, is described below.

Assuming a quadratic graded-index multimode fiber amplifier 14 with a core radius "a," and a refractive index defined by the following equation (Eq. 6), $$n(r) = \begin{vmatrix} n_1 \cdot \sqrt{1 - 2\Delta \left(\frac{r}{a}\right)^2} & \text{for } r < a \\ n_1 \cdot \sqrt{1 - 2\Delta} & \text{for } r > a \end{vmatrix} \qquad \text{Eq. 6}$$

one can show, using a WKB, (Wentzel-Kramers-Brillouin) approximation (see, e.g., "Optical Electronics," 3rd ed., A. Yariv, pg. 82) that the propagation constant of the fiber is given by $$\beta(q, m, n_1, \Delta, a, \lambda) := \frac{2 \cdot \pi \cdot n_1}{\lambda} \cdot \left[1 - \frac{2\sqrt{2 \cdot \Delta}}{2 \cdot \pi \cdot n_1 \cdot a} \cdot \lambda(q + 2 \cdot m + 1)\right]^{\frac{1}{2}} \qquad \text{Eq. 7}$$

The phase-matching condition of the fiber amplifier 18 occurs periodically. That is, the phase-matching condition occurs approximately every $\Delta L$ as given by the following equation:

$$\Delta L = \frac{2 \cdot \pi \cdot a}{\sqrt{2 \cdot \Delta}} \qquad \text{Eq. 8}$$

The validity of the above conclusions can be confirmed according to the following example. The example assumes that $n_1 = 1.5$, $\Delta = 0.0005$, the core radius $a = 100$ μm, and $\lambda = 1.55$ μm. According to Eq. 8, the expected phase-matching period $\Delta L$ is 1.9869 cm. Accordingly, the phase-matching condition takes place every 1.9869 cm of the multimode fiber amplifier 18.

A numerical computation, which searches for a length satisfying the phase-matching condition of Eq. 4, can be utilized to analyze the problem more rigorously. From such analysis, a phase-matching parameter $\Phi$ can be calculated such that:

$$\Phi = \sum_{q=0}^{q_{max}} \sum_{m=1}^{m_{max}(q)} (1 - \cos(\Delta\beta_{qm} \cdot L))^2 \qquad \text{Eq. 9}$$

Ideally, the phase-matching condition is achieved when $\Phi=0$. However, it may be that the mode constants are such that an exact phase-matching cannot be achieved. Accordingly, a minimum for $\Phi$ can be sought.

Figure 2:
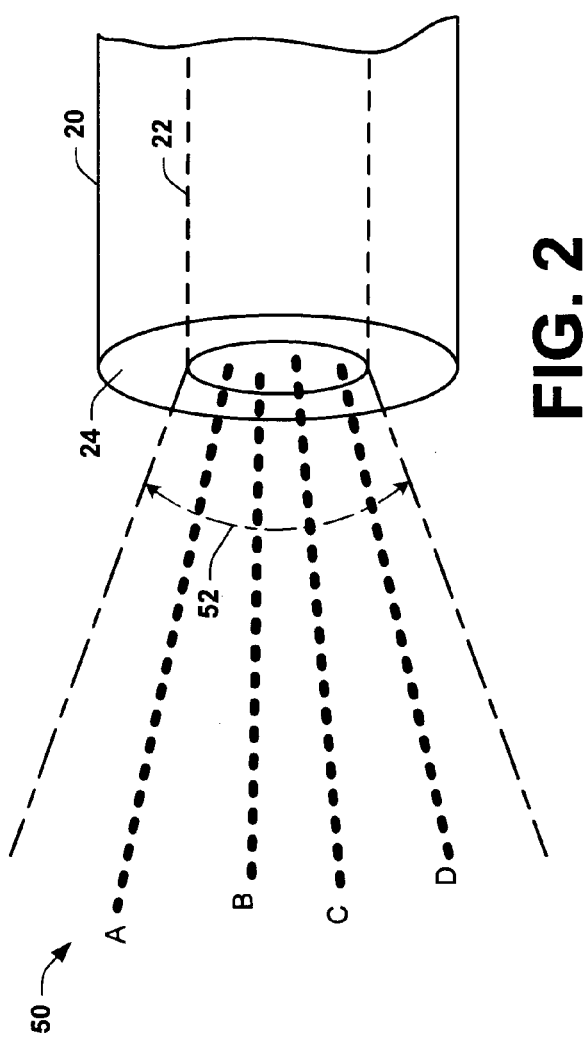
FIG. 2 depicts an example of a plurality of image signals being applied at an input face of a multimode fiber amplifier in accordance with an aspect of the present invention.
Figure 3:
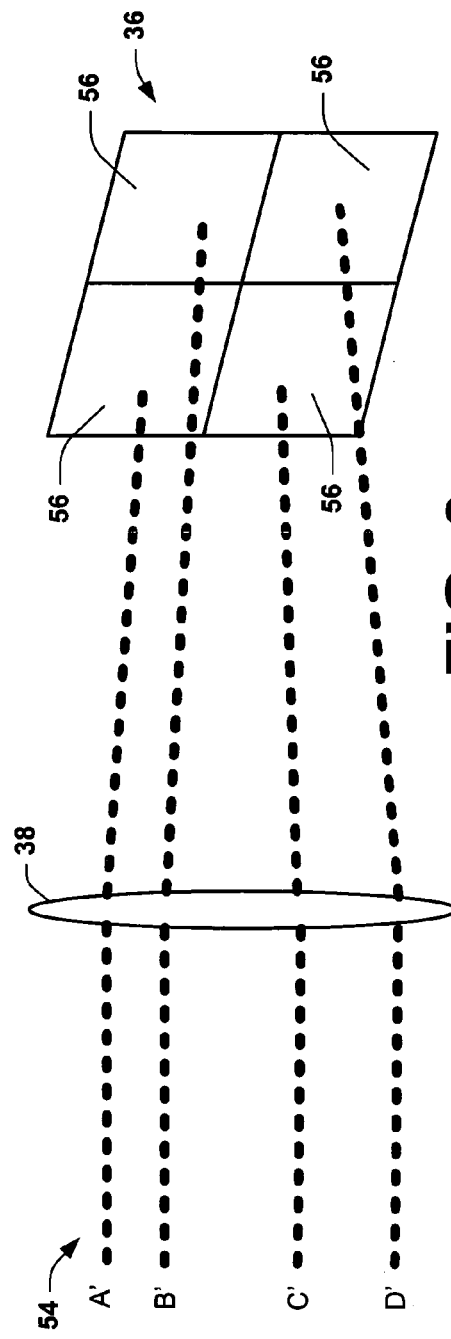
FIG. 3 depicts an example of the plurality of image signals from FIG. 2 being provided at a detector array in accordance with an aspect of the present invention.

The effect of implementing the multimode fiber amplifier 18 at a length (L) corresponding to the phase-matching length will be further appreciated with reference to FIGS. 2 and 3. In FIG. 2, an input field 50 is applied at the input facet 16 of the fiber amplifier 18. By including a multimode fiber, fiber amplifier 18 is capable of propagating and amplifying different modes along its length for light received over a range acceptance angles (e.g., corresponding to a cone of acceptance), indicated at range 52. For example, the input field 50 includes a plurality of incident light signals (e.g., beams or rays indicated at A, B, C, and D, residing within the acceptance angle 52. The light signals A, B, C, and D may be at the same or different wavelengths, although typically within a predetermined band that is capable of amplification by the fiber amplifier 18. For instance, each of the signals A, B, C, and D may correspond to a portion of different return signals reflected from one or more objects (e.g., one or more targets) in response to respective transmitted signals (e.g., from a laser) directed to illuminate the one or more objects. It is to be understood and appreciated that four signals are shown as forming the field 50 for purposes of illustration only, as there may be a greater or lesser number of signals. The signals A, B, C, and D thus define the input electromagnetic field 50 for the fiber amplifier 18.

The input electromagnetic field 50 at the input facet 16, corresponding to rays A, B, C, and D, decomposes into respective modes that travel through the core 22 of the fiber amplifier 18 (see, Eq. 1). That is, the signals A, B, C, and D can propagate as different modes through the core 22 of the fiber amplifier 18. Since not all modes travel at the same velocity through the core 22, the signals transmitted at the output facet of the fiber 20 may be out of order due to multimode distortion. However, the information or image content of each of the respective modes will be amplified.

FIG. 3 depicts the amplified output electromagnetic field 54, which includes respective output signals, indicated at A', B', C', and D'. The output signals A', B', C', and D' can correspond to amplified and filtered versions of the respective input signals A, B, C and D (FIG. 2). Each of the amplified output signals A', B', C', and D' is presumed to have been filtered to remove ASE as well as other noise, such as shown and described herein. Since the fiber amplifier 18 is implemented with the phase-matching length, the fidelity of the respective input signals is substantially preserved in the amplified output signals A', B', C', and D' transmitted by the output facet of the fiber amplifier 18.

As shown in FIG. 3, the respective amplified output signals A', B', C', and D' are focused and imaged onto the focal plane detector array 36 that lies in the focal plane of the lens 38. The detector array 36 can include a plurality of detectors 56 arranged in a desired configuration (e.g., a two-dimensional array). Different detectors 56 can receive different amplified output signals A', B', C', and D'. As an example, the different amplified output signals A', B', C', and D' can correspond to angles of a ladar system, such that the aggregate image received by the detectors 56 covers a desired field of view. That is, each pixel of the detector array 36 can correspond to a different angle of ladar amplitude (e.g. each pixel implemented as a separate photodetector). Additionally, since the total spontaneous emissions is distributed across all modes of the fiber amplifier 18, there is a corresponding increase in signal-to-noise ratio for each of the signals A', B', C', and D' at the focal plane in which the detector array 36 resides. Additionally, since the detector array 36 has a plurality of detectors 56, the spontaneous emissions will not be in focus at the focal plane except for a relative small amount of spontaneous emissions in a narrow band around the respective output signals A', B', C', and D'. This results in further spatial rejection of the amplified spontaneous emissions in the focal plane image since a significant portion of the spontaneous emissions likely will not be directed at the sensitive area of each detector 56, further increasing the signal-to-noise ratio.

Those skilled in the art will understand and appreciate various types and configuration of detectors 56 that can be utilized in the detector array 36. For example, the detectors 56 can include an arrangement of two or more digital sensors, analog sensors, charge coupled device (CCD) sensors, complementary metal oxide semiconductor (CMOS) sensors, charge injection device (CID) sensors. The arrangement of detectors 56 may be implemented as an array, such as a linear or two-dimensional array. Additionally, the array 36 can include any number of two or more detectors to provide a corresponding low resolution image in response to the input electric field 50.

Figure 4:
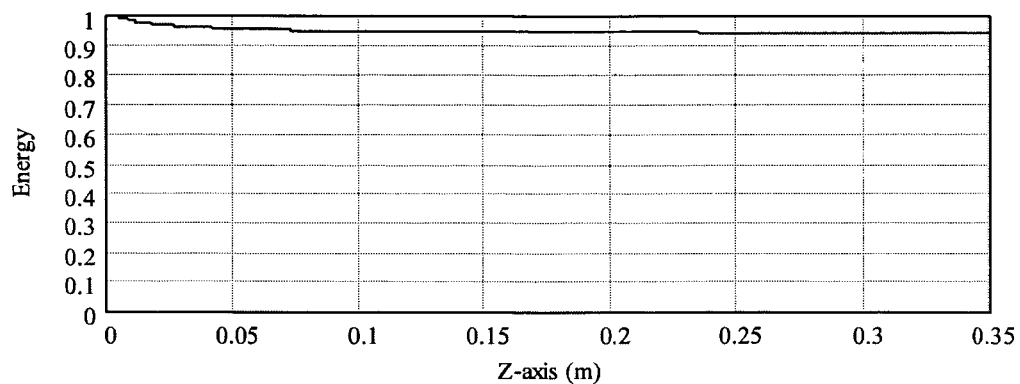
FIG. 4 is a graph depicting beam energy as a function of distance along an optical fiber.

FIG. 4 is a graph depicting beam energy as a function of distance along an optical fiber. From FIG. 4 is shown that the energy remains substantially constant after an initial (relatively small) decrease from the input facet (z=0). The effect of beam energy along the length of the fiber is a property of the optical fiber.

Figure 5:
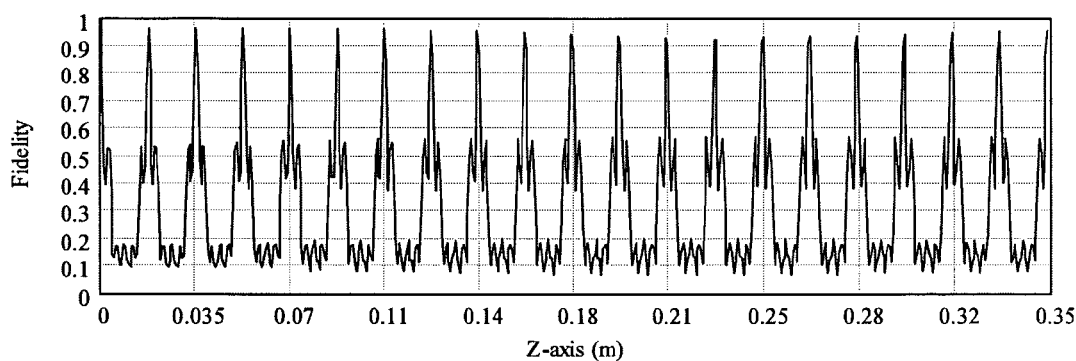
FIG. 5 is a graph depicting beam fidelity as a function of distance along an optical fiber.

FIG. 5 is a graph depicting beam fidelity as a function of distance along the length of an optical fiber. As depicted, the fidelity varies along the length, but periodically reconstitutes at the respective phase matched lengths (at the signal peaks). Thus, by configuring the fiber amplifier to one of the phase matched lengths, the signal transmitted at the output facet will be a high fidelity signal.

Figure 6A:
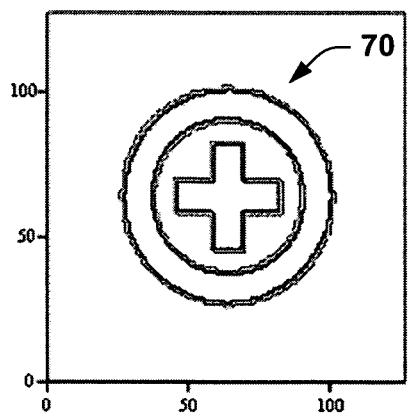
FIG. 6A depicts an example of an input image provided at the input face of a fiber amplifier implemented in accordance with an aspect of the present invention.

By way of further example, FIG. 6A depicts an example of an input image provided at the input facet of a fiber amplifier implemented in accordance with an aspect of the present invention. The input image 70 includes a pair of concentric circles around a plus sign. The image may be generated by a laser or other devices within a predetermined band.

Figure 6B:
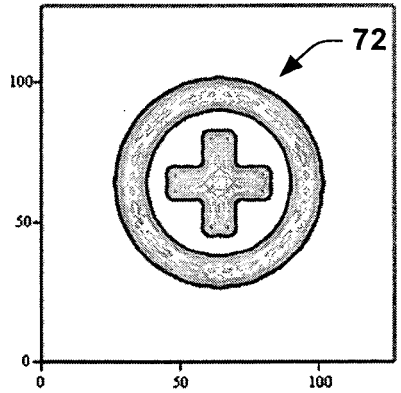
FIG. 6B depicts an example of an output image provided at the output face of a fiber amplifier implemented in accordance with an aspect of the present invention.

FIG. 6B depicts an example of an output image 72 provided at the output facet of a phase-matched fiber amplifier corresponding to the input image 70 of FIG. 6A. For the example, of FIG. 6B, the fiber amplifier is implemented as a quadratically graded-index fiber having an index of refraction at the core $n_{core}=1.5$, a relative refractive index $\Delta=0.001$, a core radius of $a=250$ μm, and assuming the input light signal having a nominal wavelength of about $\lambda=1.0$ μm. Additionally, the fiber has been configured to have a phase-matched length of $L=0.3484$ m. Other phase matched lengths and types of fiber can be utilized to provide similar results in accordance with an aspect of the present invention. The output image of FIG. 6B thus corresponds to a high fidelity amplified version of the input coupled image of FIG. 6A, which can be imaged onto a focal plane detector array, such as described herein. It is to be understood that the different parts of the image can be received by different detectors of the detector array so that the aggregate detected image corresponds to the input image received at the input facet of the fiber amplifier.

Figure 7:
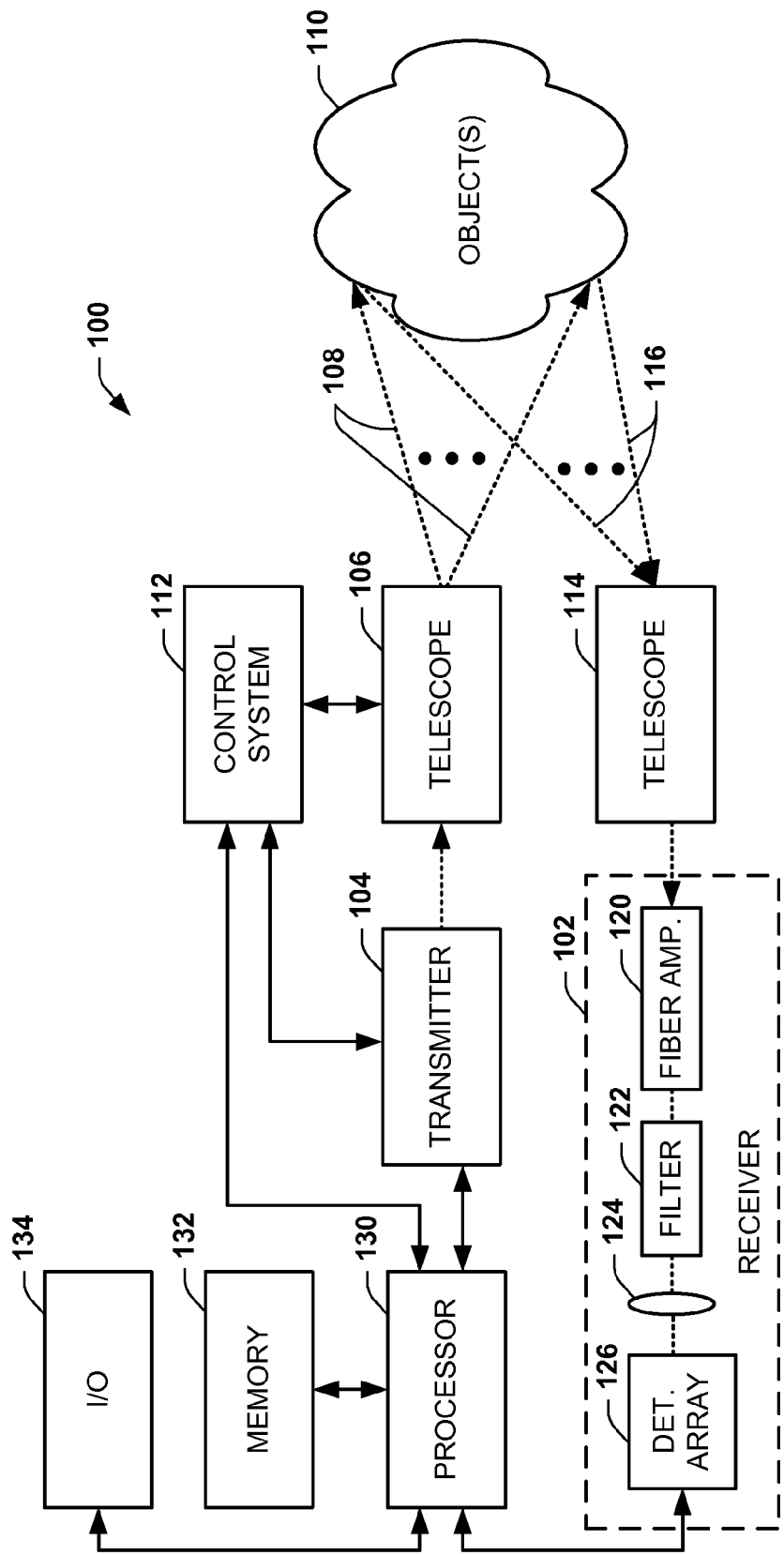
FIG. 7 depicts an example of a ladar system implementing an image detection system in accordance with an aspect of the present invention.

FIG. 7 depicts an example of a ladar system 100 that includes a receiver 102 implementing an image detection system 102 in accordance with an aspect of the present invention. The ladar system 100 includes a transmitter 104 that is configured to emit laser radiation. For example, the transmitter includes a semiconductor laser (e.g., a diode) that is driven by a high power amplifier and oscillator subsystem (as are know in the art and therefore not shown for purposes of brevity). A control system 112 can be operatively connected to control the telescope 106 and/or the transmitter 104 for directing (or pointing) the beam at the desired target scene or field of view. The control system 112, for example, can control the transmitter 104 to produce continuous wave or pulsed laser radiation beam into the field of view. A telescope 106 collimates and projects the beam(s), indicated schematically at 108. The beam(s) 108 can be sufficiently wide to encompass or floodlight a target scene of interest, including any number of one or more objects 110 in the target scene. As one example, a plurality of different beams 108 can be directed at different amplitude angles and over a range of latitude angles to cover a predetermined two dimensional field of view. For example, each beam 108 can correspond to a pulse of electromagnetic radiation at one or more wavelengths and having a predetermined pulse duration (e.g., in a range of about 3-10 ns).

A portion of the transmitted laser beam 108 is reflected from the one more objects 110 in the field of view back toward the ladar system 100. The objects 110 can be stationary or moving in two- or three-dimensional space. A telescope 114 (e.g., one or more lenses) collects the return beam (or beams), indicated at 116. The same telescope can be used for both transmitting and receiving the laser energy if means (e.g., a transmit and receive switch) are available for isolating the outgoing and returning signals. The telescope 114 collects the return beam(s) 116 and relays the received light onto an input facet of a fiber amplifier 120. The fiber amplifier 120 is configured (e.g., via a pump system) to amplify the received light that travels along the length of the core. According to an aspect of the present invention, the fiber amplifier 120 is configured as a multimode (e.g., a graded or step index) optical fiber having a phase-matching length, such as described herein. The multimode fiber has an aperture to receive light beams over a broad range of incidence angles, which received beams are amplified as they propagate as different modes through the multimode fiber amplifier. Additionally, different return beams can propagate as different modes through the multimode fiber amplifier. The phase matching length also enables the different modes to be substantially in-phase at the output facet of the fiber amplifier 120.

The fiber amplifier 120 provides the amplified (and substantially in-phase) output signals to a suitable filter to remove a substantial portion of the amplified spontaneous emissions. For example, the filter 122 can be configured as a narrow band-pass filter to remove out-of-band amplified spontaneous emissions and other noise. Since the amplified spontaneous emissions are distributed substantially uniformly over a broad range of frequencies, the filtering affords enhanced spatial rejection of spontaneous emissions for the target band or subset of bands (corresponding to the transmitted beams). One or more lenses 124 are arranged to image the filtered amplified light signals onto focal plane detector array 126. The detector array 126 detects the received image and converts it to an appropriate electronic signal format. Each photo-detector element in focal plane detector array 126 converts incident light power into a corresponding electric charge. For example, the focal plane detector array 126 collects data periodically corresponding to different temporal images (or frames) that spatially describe the object or objects 110 within the field of view. The data collected over time can define a two-dimensional representation of the object(s) 110 in the field of view of the ladar system 100 over any number of frames.

The ladar system 100 also includes a signal processor 130 and associated memory 132. The memory can include read-only memory (ROM), random access memory (RAM), and mass storage memory (e.g., hard disk drives, flash memory) or other types of memory suitable for implementing the ladar system 100. The signal processor 130 can be implemented as one or more microprocessor or digital signal processors programmed and/or configured to control and implement the ladar functions.

For example, the processor 130 can compute range, distance or velocity for each of a plurality of targets according to radiation energy rays received at corresponding incidence angles relative to the aperture of ladar transmitter 104. The processor 130 further can forms range cells for each of such incidence angles. The range or distance computations can be implemented in a variety of ways, such as by performing the Discrete Fourier Transform (DFT) on the time signal resident in each pixel. Other ranging and distancing functions can be utilized to provide a corresponding transformed data set, such as based on implementing a range counter based on a start and stop clock times for signals transmitted to the target scene of objects 110. The signal processor 130 can employ the transformed data set to form three-dimensional image data of the illuminated scene, including one or more objects 110 located in the scene. The memory 132 can contain the algorithm utilized by the signal processor 130 as well as store the collected and transformed data to provide a corresponding representation of the image to an input/output device 134.

For example, the input/output device 134 can include a display monitor (e.g., CRT or LCD based display system) as well as an associated human-machine interface. The range and distance information associated with the scene further can be supplied directly (or indirectly) to other systems, including for implementing targeting and safety systems. Those skilled in the art will understand various types of display formats and other outputs (e.g., visual or audible) that can be provided based on computations performed by the signal processor 130.

By way of further example, one particular measure of ladar system 100 performance is the signal-to-noise ratio (SNR) at the output of each element (pixel) in the focal plane detector array 126. The SNR produced for given target illumination conditions is proportional to the sensitivity of the detector. The optical amplification of the image can also improve the sensitivity of the imaging receiver 102, such as to achieve significant system gains. For example, the approach described herein also provides a potential improvement in imaging ladar receiver sensitivity of 10-15 dB or greater, which translates directly to a potential reduction of the same order for the required transmitter power. Thus, by implementing preamplification using a multimode fiber amplifier 120, according to an aspect of the present invention, detectors of reduced sensitivity (e.g., less expensive detectors) can be utilized in the array 126 without reducing performance relative to many existing ladar systems. Alternatively, an increase in receiver 102 sensitivity can enable a reduction in transmitter power while maintaining a constant SNR. Moreover, the multimode fiber amplifier can also enable a the detector array to be implemented with smaller detector elements relative to many existing ladar systems, such that the ladar system 100 as a whole can to be made smaller.

There are many ladar applications in which it is desirable to illuminate a large target volume and detect the return signals from multiple targets within that volume simultaneously. An example would be a space interceptor seeking inbound warheads. Another would be imaging through foliage or camouflage netting. The approach described herein thus enables these and other applications to be realized along with a corresponding reduction of transmitter power required or an increased probability of detection. For example, the image detection systems, as shown and described herein, can also be utilized in other types of systems, such as including but not limited to wavefront sensors or lasercom multiple access receivers.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An image detection system comprising:
a multimode fiber amplifier that includes an optical fiber having a given core configured to receive an input image that includes a plurality of input beams spanning a range of incidence angles and to propagate at least some of the input beams as different ones of a plurality of transverse modes along the core, the multimode fiber amplifier providing an amplified image at an output facet thereof corresponding to the input image; and
a focal plane detector that includes an array of detectors, each of the detectors in the array of detectors being arranged to receive different predetermined portions of the amplified image provided at the output facet of the given core.

2. The detection system of claim 1, wherein the multimode fiber amplifier has a length that is set to a phase-matching length in which transverse modes of the multimode fiber amplifier are substantially in-phase at an output facet of the multimode fiber amplifier.

3. The detection system of claim 1, further comprising at least one filter located between the output facet of the given core of the multimode fiber amplifier and the focal plane detector, the at least one filter being configured to remove out-of-band amplified spontaneous emissions from the amplified image.

4. The detection system of claim 3, further comprising a lens located between the at least one filter and the focal plane detector, the lens being configured to focus the amplified and filtered image onto the focal plane detector.

5. The detection system of claim 3, wherein the amplified spontaneous emissions are distributed across the plurality of transverse modes of the multimode fiber such that the amplified spontaneous emission combine incoherently across the array of detectors of the focal plane detector to increase signal-to-noise ratio for at least a portion of the amplified image.

6. The detection system of claim 1, wherein a number of the plurality of transverse modes is greater than the number of detectors in the focal plane detector.

7. The detection system of claim 6, wherein the plurality of transverse modes is a number that is at least two times greater than the number of detectors in the focal plane detector.

8. The detection system of claim 1, wherein the optical fiber is one of a graded-index multimode optical fiber and a step-index multimode optical fiber.

9. A laser detection and ranging (ladar) system comprising the image detection system of claim 1, the ladar system further comprising:
a transmitter configured to transmit beams of radiation energy, the plurality of input beams received by the multimode fiber amplifier corresponding to portions of the radiation energy reflected off at least one object in a field of view; and
a processor programmed to ascertain at least one of range or distance of the at least one object based at least in part on the amplified image being imaged onto the focal plane detector.

10. An image detection system comprising:
a multimode fiber amplifier that includes a given core having a length set to a predetermined phase-matching length such that an input image at an input facet of the given core is substantially in-phase with an output image at an output facet of the given core, signal power of the input image being amplified as different portions of the input image propagate as different transverse modes through the given core, such that the output image corresponds to the input image, the output image including amplified spontaneous emissions distributed across the different transverse modes of the core;
a filter arranged to remove at least a substantial portion of the amplified spontaneous emissions from the output image to provide a corresponding filtered output image; and
a focal plane detector configured to receive the filtered output image from the output facet of the given core, the focal plane detector that includes an array of detectors arranged to receive different portions of the filtered output image.

11. The detection system of claim 10, further comprising:
a first lens located between the output facet of the multimode fiber amplifier and the filter for relaying the output image onto the filter; and
a second lens located between the filter and the focal plane detector for focusing the filtered output image onto the focal plane detector.

12. The detection system of claim 10, wherein the amplified spontaneous emissions are distributed substantially uniformly across the plurality modes of the core such that the amplified spontaneous emission combine incoherently across the array of detectors of the focal plane detector to increase signal-to-noise ratio for at least a portion of the filtered output image.

13. The detection system of claim 10, wherein the core is one of a graded-index core and a step-index core.

14. The detection system of claim 10, wherein a number of the different transverse modes is at least two times greater than the number of detectors in the focal plane detector.

15. A laser detection and ranging (ladar) system comprising the image detection system of claim 10, the ladar system further comprising:
a transmitter configured to transmit beams of radiation energy, the input image received at the input facet of the multimode fiber amplifier corresponding to portions of the radiation energy reflected off at least one object in a target scene; and a processor programmed to ascertain at least one of range or distance of the at least one object based at least in part on the filtered output image.

16. A laser detection and ranging (ladar) system comprising:

a transmitter configured to transmit beams of electromagnetic radiation energy;

a first telescope that directs the beams of radiation energy at a target scene;

a second telescope that receives returning portions of the radiation energy reflected off at least one object in the target scene;

a multimode fiber amplifier that includes a given core configured to receive an input image from the second telescope that includes a plurality of input beams spanning a range of incidence angles and to propagate at least some of the input beams as different ones of a plurality of transverse modes along the given core, the multimode fiber amplifier providing an output image at an output facet thereof corresponding to the input image with increased signal power;

a focal plane detector that includes an array of detectors each arranged to receive different portions of the output image; and a processor that determines at least one of range, distance or velocity of the at least one target based at least in part on the output image.

17. The system of claim 16, wherein the given core of the multimode fiber amplifier has a length set to a predetermined phase-matching length such that the input image at an input facet of the given core is substantially in-phase with an output image at the output facet of the given core.

18. The system of claim 17, the output image including amplified spontaneous emissions distributed across the modes of the given core such that the amplified spontaneous emissions combine incoherently across the array of detectors of the focal plane detector to increase signal-to-noise ratio for at least a portion of the output image.

19. The system of claim 17, a filter arranged to remove at least a substantial portion of the amplified spontaneous emissions from the output image to provide a corresponding filtered output image that is provided to the focal plane detector.

20. The system of claim 19, further comprising a lens located between the filter and the focal plane detector for focusing the filtered output image onto the focal plane detector.

21. The system of claim 16, wherein the given core is one of a graded-index core and a step-index core.

22. The system of claim 16, wherein a number of the plurality of transverse modes is at least two times greater than the number of detectors in the focal plane detector.

* * * * *